United States Patent [19]
Yamamoto et al.

[11] Patent Number: 6,161,592
[45] Date of Patent: Dec. 19, 2000

[54] HEAT-RESISTANT HOSE

[75] Inventors: Yasuo Yamamoto; Shinobu Kanbe; Masashi Kondo, all of Komaki; Hiroyoshi Mori, Iwakura, all of Japan

[73] Assignee: Tokai Rubber Industries, Ltd., Aichi, Japan

[21] Appl. No.: 09/275,538

[22] Filed: Mar. 24, 1999

[30] Foreign Application Priority Data

Mar. 31, 1998 [JP] Japan .................................. 10-086330

[51] Int. Cl.$^7$ ...................................... F16L 11/00
[52] U.S. Cl. .......................... 138/126; 138/137; 138/140; 138/141
[58] Field of Search .................................... 138/137, 140, 138/141, 125–127, DIG. 3

[56] References Cited

U.S. PATENT DOCUMENTS

| | | | |
|---|---|---|---|
| 4,041,207 | 8/1977 | Takada et al. | 428/421 |
| 4,330,017 | 5/1982 | Satoh et al. | 138/126 |
| 4,942,906 | 7/1990 | Igarashi et al. | 138/126 |

FOREIGN PATENT DOCUMENTS

| | | |
|---|---|---|
| 64-14265 | 1/1989 | Japan . |
| 1-152060 | 6/1989 | Japan . |
| 4-283255 | 10/1992 | Japan . |
| 5-266716 | 10/1993 | Japan . |
| 5-287156 | 11/1993 | Japan . |
| 9-194539 | 7/1997 | Japan . |
| 10-231386 | 9/1998 | Japan . |

*Primary Examiner*—Patrick Brinson
*Attorney, Agent, or Firm*—Rodney F. Brown

[57] ABSTRACT

A heat-resistant hose for transport of high temperature fluid, wherein the inner surface of the hose in contact with said fluid comprises a material containing blended rubber of fluorinated rubber (FKM) and acrylic rubber (ACM). In particular, a heat-resistant hose for transport of fluid containing high temperature oil which comprises an inner tubular body composed of one or more layers at least the most inner layer of which consists of blended rubber of FKM and ACM, fiber reinforcements wound around the outer surface of said inner tubular body the thread extracting force of which the fiber reinforcements is not less than 1N/mm, and an outer tubular body composed of one or more layers bonded on the surface of said fiber reinforcements, said most inner layer preferably containing carbon black having the value (A×B) of not more than 3500 obtained by multiplying the value A of nitrogen adsorption specific surface area (m$^2$/g) by the value B (PHR) of part by weight of amounts of carbon black used is added to the blended rubber.

10 Claims, No Drawings

HEAT-RESISTANT HOSE

FIELD OF THE INVENTION

The present invention relates to a heat-resistant hose and more particularly to an air hose and oil hose for automobile, in particular, a heat-resistant hose suitable for transport of fluid containing high temperature oil such as an air hose for a supercharger where oil resistance, pressure resistance, heat-aging resistance and the like are required.

BACKGROUND OF THE INVENTION

In the production of an air hose or oil hose for an automobile, nitrile rubber (abbreviated as "NBR" hereinafter) has been typically used for its inner tube and chloroprene rubber (abbreviated as "CR") for its outer tube (JP-A-H04-283255(1992)) since oil resistance is required for the inner tube and weather resistance for the outer tube, and in the case that heat resistance is specifically required, acrylic rubber (abbreviated as ACM), for example, has been used for the outer tube (JP-A-S64-14265(1989) and JP-A-H04-283255 (1992)).

Recently, pressure resistance enough to withstand the supercharger pressure as high as 0.15 MP is required in air hoses in use for supercharger in a vehicle equipped with a turbo charger for obtaining enhanced engine power and heat-aging resistance under rigorous conditions such as at operations of about 10,000 hours at 150° C. is required for the inner tube materials, and, an attempt has been made to use fluorinated rubber (abbreviated as "FKM"), at least, for the inner tube of a heat-resistant hose (JP-A-H01-152060 (1989)).

However, such rigorous heat-resistance requirements cannot be satisfied with the hoses using NBR for the inner tubes and CR for the outer tubes or with those hoses using ACM materials. Moreover, when fluid such as high temperature engine oil is to be transported, such hoses as described above are not able to provide both high level heat-resistance and oil resistance simultaneously.

On the other hand, there are problems with the heat-resistant hoses using FKM for, at least, its inner tubes that they are expensive and that FKM, when used for supercharger air hoses, will be deteriorated by amine components contained in engine oil as an additive since the turbo charger mechanism circulates a part of high temperature waste gas containing particles of engine oil into the air hose, and thus FKM hoses are also difficult to satisfy both high level heat-resistance and oil resistance simultaneously.

Heat-resistant hoses ordinarily contain fibers wound around between the inner and outer tubes for reinforcement purpose. Fiber reinforcements made by knitting filament threads with smooth surfaces have been conventionally used in many cases. However, since the bonding strength between the inner tube and such fiber reinforcements is not sufficient, when the hose is subjected to internal pressure change repeatedly, threads at the end of the hose may shrink toward the center of the hose due to changes in the hose diameters, causing slip-out of the threads, which will impair the air-tightness or liquid-tightness. Such defects or disadvantages tend to become more remarkable as requirements for heat-resistance become more rigorous.

Therefore, an object of the present invention is to solve these problems and provide a heat-resistant hose which is excellent in oil resistance, pressure resistance and heat-aging resistance and that is suitable for transport of fluid containing high temperature oil.

SUMMARY OF THE INVENTION

We, the inventors of the present invention, have found the fact that a heat-resistant hose which can satisfy both heat-resistance and oil resistance simultaneously even under rigorous heat-aging conditions can be obtained by using blended rubber of fluorinated rubber and acrylic rubber as materials for the inner surface of the hose to be in contact with the fluid, by using spun threads or filament fibers with a specific twist number as fibrous reinforcement materials to be used, and by selecting the grade and the amount of carbon black to be added to said blended rubber, thereby solving problems described above.

According to the present invention, a heat-resistant hose as described below is provided.

1. A heat-resistant hose for transport of high temperature fluid wherein the inner surface of the hose in contact with said fluid comprises a material containing blended rubber of fluorinated rubber and acrylic rubber.
2. The heat-resistant hose as defined in the above item 1 wherein the hose is to be used for fluid containing high temperature oil.
3. The heat-resistant hose as defined in the above item 1 wherein the hose comprises an inner tubular body composed of one or more layers at least the most inner layer of which consists of blended rubber of fluorinated rubber and acrylic rubber, fiber reinforcements wound around the outer surface of said inner tubular body, and an outer tubular body composed of one or more layers bonded on the surface of said fiber reinforcements.
4. The heat-resistant hose as defined in the above item 3 wherein the fiber reinforcements are composed of spun threads or filament threads with a twist number of not more than 100 turn/m.
5. The heat-resistant hose as defined in above item 4 wherein the thread extracting force of the fiber reinforcements is not less than 1N/mm.
6. The heat-resistant hose as defined in item 1 wherein the blended rubber is rubber in which fluorinated rubber and acrylic rubber are uniformly dissolved together.
7. The heat-resistant hose as defined in item 1 wherein the blending ratio of said blended rubber, in weight, of fluorinated rubber and acrylic rubber is within the range of 2~8:8~2.
8. The heat-resistant hose as defined in item 1 wherein carbon black having the value (A×B) of not more than 3500 obtained by multiplying the value A of nitrogen adsorption specific surface area ($m^2/g$) by the value B (PHR) of part by weight of amounts of carbon black is added to the blended rubber.
9. The heat-resistant hose as defined in item 2 wherein the fluid containing high temperature oil is a high temperature oil or a high temperature gas containing oil particles.
10. The heat-resistant hose as defined in the above item 1 wherein the hose is a hose used for a supercharger.

DETAILED DESCRIPTION

The present invention is hereinafter described in details.
[Heat-resistant Hose]

According to the present invention, the heat-resistant hose includes a hose used for transport of high temperature fluids including a gas, liquid or mixture thereof.

The hose of the present invention can be typically used as an air hose for a supercharger, and as hoses for an exhaust gas re-circulating (EGR) system, engine oil cooler, automatic transmission cooler and the like in an automobile. A preferable use of the hose of the present invention is for a supercharger in which part of high temperature waste gas containing particles of engine oil is circulated.

The hose of the present invention includes a hose comprising a monolayer (monoply) rubber tube the inner surface of which in contact with fluid comprises blended rubber of FKM and ACM; a hose comprising the inner tubular body composed of one or more layers at least the most inner layer of which comprises blended rubber of FKM and ACM and the outer tubular body composed of one or more layers made of any material; and a hose further comprising fiber reinforcements wound between the inner tubular body and outer tubular body, which are suitable for transport of a high temperature gas containing high temperature oil or oil particles in particular.

Preferably, the hose of the present invention is provided with mono- or multi-layer inner tubular body, fiber reinforcements wound around the inner tubular body and mono- or multi-layer outer tubular body bonded to these materials. Materials containing blended rubber of FKM and ACM are used, at least, for the most inner layer of the hose. The term "most inner layer of the hose" herein refers to the inner tube of the hose when the inner tubular body are in the form of a monolayer tube and the most inner layer of the inner tubular body when the inner tubular body is in the form of a multi-layer tube containing two or more layers.

The blended rubber of FKM and ACM can be used for a layer other than the most inner layer of the inner tubular body of the hose and for the outer tubular body as well. It will be apparent to those skilled in the art that the application of the heat-resistant hose of the present invention is not limited to that for transport of high temperature gases containing high temperature oil or oil particles but it includes all uses for transport of high temperature fluids.

[Blended Rubber]

According to the present invention, a material containing blended rubber of FKM and ACM is used taking into consideration costs of the materials and bonding strength to the outer layer materials.

The ratio of blending of the FKM and ACM is basically not limited. However, the blended rubber having its blending ratio, in weight, of the FKM:ACM ranging from 2:8 to 8:2 is preferably effective for satisfying conditions of high level heat-resistance or heat-resistance/oil resistance. More preferably, the blending ratio is within 3:7 to 7:3.

The method of blending of FKM and ACM to be used for the heat-resistant hose is not limited. For example, so-called "dry blended rubber" manufactured by mechanically kneading/blending unvulcanized FKM and ACM using a roll and then vulcanizing them may be used.

The blended rubber of FKM and ACM is preferably in the form of uniformly or homogeneously dispersed blended rubber in which FKM and ACM are dissolved with each other. The uniformly dispersed blended rubber is particularly effective for satisfying the conditions of high level heat-resistance or heat-resistance/oil resistance required for the heat-resistant hose. The compatible and uniformly dispersed blended rubber herein refers to blended rubber in which FKM and ACM are uniformly dispersed at the molecular level with each other and are not separated from each other.

It is ,however, difficult to obtain uniformly dispersed blended rubber by the dry blending method. The uniformly dispersed blended rubber can be obtained, for example, by a latex blending method in which ACM latex and FKM latex are mixed and agitated and then coagulated, or by a process wherein FKM is dissolved or swelled in an acrylic monomer and subsequently the acrylic monomer is polymerized and cross-linked with a required filler or a cross-linking agent added thereto.

[Fluorinated Rubber (FKM)]

According to the present invention, one or more kinds of fluorinated rubber selected from known any kind of FKM may be used. For example, vinylidene fluoride copolymers such as vinylidene fluoride/hexafluoropropylene, vinylidene fluoride/tetrafluoroethylene/hexafluoroproplylene, vinylidene fluoride/chlorotrifloroethylene, etc can be preferably used. Also, copolymers of tetrafluoroethylene/propylene, hexafluoropropylene/ethylene, fluoroalkyl vinylether (including one containing plural ether linkages)/olefin, and fluorosilicone rubber or fluorophosphazene rubber, etc., may be used preferably. FKM which can be cross-linked using peroxide is also highly preferable.

[Acrylic Rubber (ACM)]

According to the present invention, any kind of known acrylic rubber, for example, one or more kinds of polymers composed of the following one or more kinds of acrylate monomers and, if necessary, one or more kinds of other monomer components may be used.

Examples of acrylate monomers include acrylates such as methyl acrylate, ethyl acrylate, propyl acrylate, n-butyl acrylate, n-octyl acrylate, methoxymethyl acrylate, methoxyethyl acrylate, ethoxyethyl acrylate and the corresponding methacrylates.

Examples of the other monomer components usable in ACM include vinyl esters such as vinyl acetate, vinyl propionate, vinyl butyrate, etc. ;vinyl ketones such as methyl vinyl ketone, ethyl vinyl ketone, etc. ; vinyl aromatic compounds such as styrene, $\alpha$-methylstyrene, vinyltoluene; conjugate diene such as butadiene, isoprene, etc.; $\alpha$-monoolefins such as ethylene, propylene, 1-butene, etc.; vinyl monomers having a hydroxyl group such as $\beta$-hydroxyethyl acrylate, 4-hydroxybutyl acrylate, etc.; vinyl monomers or vinylidene monomers having a nitrile group such as acrylonitrile, methacrylonitrile, $\beta$-cyanoethyl acrylate, etc.

Among them, the most preferable ACM is a type of the ACM which can be cross-linked using peroxide.

The acrylic monomer used to prepare the uniformly dispersed blended rubber can be also selected optionally. Examples of such monomers include n-butyl acrylate, ethyl acrylate, ethylene glycol dimethacrylate, tetraethylene glycol dimethacrylate, MMA (methyl methacrylate), EMA (ethyl methacrylate), BMA (butyl methacrylate), HEMA (2-hyroxy-ethyl methacrylate), GMA (glycidyl methacrylate), MEMA (2-methoxyetyl methacrylate), MSPM (3-trimethoxyethyl methacrylate), MSPM (3-(trimethoxysilyl)-propyl methacrylate), etc., or one or more kinds of corresponding $\alpha$-fluoroacrylate can be used as well.

[Fiber reinforcements]

The fiber reinforcements wound around the surface of the inner tubular body used in the preferred embodiment of the present invention are composed of spun threads or filament threads with a twist number of not more than 100 turn/m.

The spun thread herein refers to a yarn formed by collecting and arranging and twisting a large number of staples (short fibers). The spun thread has so-called "fuzz", which serves to improve adhesive strength between the threads and rubber due to its anchoring effect, thereby preventing slip-out of threads from the hose tube materials, thus ensuring sufficient bonding strength to the inner tubular body of the hose and improving the air-tightness and liquid-tightness as well.

The filament thread herein refers to a thread formed by bundling and twisting a large number of filaments (long fibers). Generally, the filament thread has no fuzz and tends to slide on the hose tube materials, leading to easy slip-out of threads. However, inventors have found that, if the twist number of threads is not more than 100 turn/m, threads become deformed to a flat state at the time of formation of the hose, the filament threads contact closely with rubber materials at a large area, improving adhesive strength to the rubber as in the case of spun threads.

Preferable fiber reinforcements having resistance to slip-out of threads, expressed in terms of a parameter of thread extracting force, are those having a thread extracting force of not less than 1N/mm. The thread extracting force of not less than 1N/mm can be achieved by manufacturing the fiber reinforcements using the spun threads as mentioned above or the filament threads having a twist number of not more than 100 turn/m.

Materials for the fiber reinforcements to be used are not limited. Such spun threads or filament threads composed of aromatic polyamide fibers excellent in heat-resistance are preferred.

The forms of materials (spun threads or filament threads) for fiber reinforcements and/or twist numbers of filament threads are one of important factors for determining sealing property (air-tightness) of the heat-resistant hose. In addition, materials for inner tubular and/or outer tubular bodies of the heat-resistant hose will affect the air-tightness and, if the materials are composed only of FKM, sufficient adhesive strength to fiber reinforcements cannot be obtained generally, causing low air-tightness while the air-tightness is improved by using materials composed of ACM or blended rubber of FKM and ACM. In ordinary cases, the air-tightness of the heat-resistant hose is preferably not less than 0.15 Mpa.

[Carbon Black]

Inventors of the present invention have found that the elongation of the hose, under rigorous conditions (for example, at 200° C. for 240 hours), is greatly affected by the grade and amount of the carbon black which are generally added to materials of rubber.

That is, the decrease in the elongation of the heat-resistant hose is effectively and preferably prevented if the carbon black is used to satisfy the condition that the value (A×B) is not more than 3500, particularly not more than 3000, wherein the value A is the nitrogen adsorption specific surface area ($m^2/g$) and the value B is the amount in terms of PHR (Per Hundred Rubber) of carbon black to be added.

[Other Additives]

The blended rubber of FKM and ACM used in the present invention may optionally contain a variety of additives such as a vulcanizing agent, vulcanizing accelerater, softener, plasticizer, stabilizer, coloring agent and the like.

[Working Effect of Present Invention]

The heat-resistant hose of the present invention comprising the blended rubber of FKM and ACM at least as a material for the inner surface in contact with the fluid, especially such a hose in which said blended rubber having a blending ratio by weight within a range of 2~8:8~2 or being uniformly dissolved with each other can satisfy conditions of high level heat-resistance/oil resistance simultaneously even when used for transport of high temperature gases containing high temperature oil or oil particles.

Although there are references of related art showing that blended rubber of FKM and ACM is generally heat-resistant (EP481372, JP-A-H05-266716(1993), JP-A-H05-287156 (1993), JP-A-H09-194539(1997) and JP-A-H10-231386 (1998)), the fact that the blended rubber of FKM and ACM can satisfy heat-resistance/oil resistance under rigorous conditions such as at operations at 200° C. for 240 hours as in the Examples described below has not been known and has been realized by this invention for the first time. The heat-resistance conditions that can withstand operations at 200° C. for 240 hours of rubber materials correspond to those at 150° C. for 10,000 hours required for the heat-resistant hose described above.

The heat-resistant hose of the present invention is more cost-effective than the hose with an inner tube composed only of FKM and alleviates the deterioration of FKM components caused by amine components which are contained in engine oil as additives.

In an embodiment of the present invention wherein spun threads with so-called fuzz or filament threads with a smooth surface having a twist number not more than 100 turn/m are used as materials for fiber reinforcements for the hose, even when the heat-resistant hose is used under rigorous conditions, there is no fear that slip-out of threads occurs due to lack in adhesive strength between the inner tube of the hose and the fiber reinforcements, which in turn causes loss of air-tightness or liquid-tightness.

Moreover, according to the present invention, the fiber reinforcements having a thread extracting force of not less than 1N/mm are used as materials for the hose, and even when the heat-resistant hose is used under rigorous conditions, there is no fear that slip-out of threads occurs due to lack in adhesive strength between the inner tube of the hose and the fiber reinforcements, which in turn causes loss of air-tightness or liquid-tightness.

Furthermore, by adding carbon black satisfying the condition that A×B is not more than 3500 wherein the value A is the nitrogen adsorption specific surface area ($m^2/g$) and the value B is the amount in terms of PHR (Per Hundred Rubber) of carbon black to be added, the decrease in the elongation of the heat-resistant hose is effectively reduced. For example, under such rigorous conditions for heat-resistance that has to withstand operations at 200° C. for 240 hours, the effect is remarkable.

The heat-resistant hose of the present invention is used as an air hose and oil hose for an automobile and is suitable for transport of fluids containing high temperature oil, in particular, for a supercharger hose and the like where oil resistance, pressure resistance, heat-aging resistance and the like are required.

BEST MODE OF THE INVENTION

The present invention will be described more concretely by way of examples of the present invention and comparative examples. The present invention, however, is not limited by these examples.

(I) Materials

The following materials were used in the examples described below. Methods for preparing test pieces and methods for testing and evaluating the test pieces are also described below.

(a) Rubber materials

BLR-1: Rubber obtained by blending FKM latex with ACM latex so that the ratio of blending of FKM and ACM in weight is 30:70 (FKM:ACM) (DAI-L alloy from Daikin Industries, Ltd.)

BLR-2: Rubber obtained in the same manner as for the BLM-1 so that the ratio of blending of FKM and ACM in weight is 50:50 (FKM:ACM)

BLR-3: Rubber obtained in the same manner as for the BLM-1 so that the ratio of blending of FKM and ACM in weight is 70:30 (FKM:ACM)

BLR-4: ACM "Vamac" (brand name) from DuPont Corp.

BLR-5: FKM "DAI-L G801" (brand name) from Daikin Industries, Ltd.

(b) Carbon black

CB-1: ISAF grade carbon black "SHOBLACK N220" (brand name) from Showa Cabot Co., Ltd.(Nitrogen adsorption specific surface area: 111 $m^2/g$)

CB-2: HAF grade carbon black "SHOBLACK N330" (brand name) from Showa Cabot Co., Ltd.(Nitrogen adsorption specific surface area: 75 $m^2/g$)

CB-3: FEF grade carbon black "SEAST SO" (brand name) from Tokai Carbon Co., Ltd. (Nitrogen adsorption specific surface area: 42 $m^2/g$)

CB-4: FT grade carbon black "ASAHI THERMAL" (brand name) from Asahi Carbon Co., Ltd. (Nitrogen adsorption specific surface area: 24 $m^2/g$)

(c) Fiber reinforcements

FR-1: Aromatic polyamide fiber "CONEX" (brand name) from Teijin Limited, spun fiber, 2000 denier/pc, Twist number: 100 T/m. Count by knitting machine: 48 pcs.

FR-2: Aromatic polyamide fiber "KEVLAR" (brand name) from DuPont Corp. filament fiber, 1500 denier/pc, Twist number: 100 T/m and 350 T/m. Count by knitting machine: 16 pcs.

FR-3: Polyester, filament fiber, 1500 denier/pc, Twist number: 200 T/m, Count by knitting machine: 48 pcs.

(d) Cross-linking agents

Organic peroxide (dicumylperoxide) "Percumyl D" (brand name) from Nippon Oil & Fat Co., Ltd.

(e) Co-crosslinking agent

TAIC: triallylisocyanurate (II) Preparation of test piece

A vulcanized rubber test piece each having a shape and size in accordance with JIS test method was prepared by pressing and vulcanizing, at 160° C. for 60 minutes, unvulcanized mixture obtained by kneading mixed compositions (in part by weight) shown in examples 1~6 and comparative examples 1 and 2 in Table 1 using an open roll and then vulcanizing them by heated air in an oven at 150° C. for 8 hours.

The values obtained by multiplying the nitrogen adsorption specific surface area value A by the weight part of carbon black added to rubber in each example and comparative example were shown in column "A×B" in Table 1.

(III) Evaluation test method of test piece and results

The following evaluation tests (1~6) were performed on test pieces shown in examples 1~6 and comparative examples 1 and 2 in Table 1.

Test-1: Physical properties in the normal state were evaluated in accordance with JIS K6301. "Tensile strength", "Elongation" and "Hardness" were evaluated.

Test-2: The heat-aging resistance at operations at 175° C. for 240 hours was evaluated in accordance with JIS K6301 "Aging Test in Heated Air". "Change in tensile strength", "Elongation change", "Hardness change" and "Appearance" were evaluated. For the appearance test, aged test pieces were bent by 180° and the "○" mark was given to the test piece without abnormality, the "Δ" mark to test piece with crack on the surface and the "X" mark to broken test piece respectively.

Test-3: The heat-aging resistance was evaluated in the same manner as in the Test-2 except that the test conditions was set to "200° C. for 240 hours". The evaluation items and representations of results were the same as those in Test-2.

Test-4: The engine oil resistance under the test condition of "150° C. for 480 hours" was evaluated in accordance with JIS K6301 "Soak Test". The "Toyota Castle Diesel Oil New Special CD: 10W-30" (brand name) was used as a test solution. The evaluation items included "Change in tensile strength", "Elongation Change", "Hardness Change", "Change in volume" and "Appearance". The evaluation method and representation of results for Appearance were the same as those in Test-2.

Test-5: The engine oil resistance under the test condition of 150° C. for 480 hours was evaluated using the "Toyota Castle Diesel Oil New Special CD: 10W-30" (brand name) as a test solution in accordance with JIS K6301 "Soak Test". The test method was such that the test piece was soaked in a test solution within a glass test tube and the test tube containing the test piece was sealed by a cork stopper and held in an oil bath set at a temperature for the test while air was blown in and out through a ventilation pipe through the cork stopper. The evaluation items were the same as those in Test-4 except the rate of change in volume. The evaluation method of appearance and representations of results were the same as those in Test-4.

Test-6: The permanent compressive strain was evaluated in accordance with JIS K6301 under the condition of 175° C. for 72 hours.

TABLE 1

| Rubber Composition | Examples | | | | | | Comp. Ex. | |
|---|---|---|---|---|---|---|---|---|
| (Part by weight) | 1 | 2 | 3 | 4 | 5 | 6 | 1 | 2 |
| BLR-1(FKM/ACM = 30/70) | 100 | — | — | — | — | — | — | — |
| BLR-2(FKM/ACM = 50/50) | — | 100 | — | 100 | 100 | 100 | — | — |
| BLR-3(FKM/ACM = 70/30) | — | — | 100 | — | — | — | — | — |
| BLR-4(ACM) | — | — | — | — | — | — | 100 | — |
| BLR-5(FKM) | — | — | — | — | — | — | — | 100 |
| Stearic Acid | 1 | 1 | 1 | 1 | 1 | 1 | 1 | — |
| CB-1(SHOBLACK N220) | — | — | — | — | — | 40 | — | — |
| CB-2(SHOBLACK N330) | — | — | — | — | 40 | — | 40 | — |
| CB-3(SEAST SO) | 40 | 40 | 40 | — | — | — | — | — |
| CB-4(ASAHI THERMAL) | — | — | — | 40 | — | — | — | 40 |
| Percumyl D | 1.6 | 1.6 | 1.6 | 1.6 | 1.6 | 1.6 | 1.6 | 1.6 |
| TAIC | 1 | 1 | 1 | 1 | 1 | 1 | 1 | 1 |
| A×B | 1680 | 1680 | 1680 | 960 | 3000 | 4440 | 3000 | 960 |

Table 2 shows the results of the above Tests 1–6 in each of the working and comparative examples.

TABLE 2

|  |  |  | Examples | | | | | | Comp. Ex. | |
|---|---|---|---|---|---|---|---|---|---|---|
|  |  |  | 1 | 2 | 3 | 4 | 5 | 6 | 1 | 2 |
| TEST-1 | Tensile strength | [MPa] | 9.2 | 10 | 11.2 | 7.8 | 11 | 12.3 | 14.8 | 17 |
| (Physical properties | Elongation | [%] | 290 | 390 | 410 | 310 | 450 | 480 | 400 | 400 |
| in the normal state | Hardness(JIS A) | [Hs] | 71 | 73 | 78 | 65 | 75 | 82 | 70 | 75 |
| TEST-2 | Tensile Strength Change | [%] | −3 | 2 | −10 | 4 | −2 | −3 | −40 | 3 |
| (Heat-aging | Elongation Change | [%] | −17 | −8 | −2 | −9 | −13 | −21 | −25 | −5 |
| Resistance-1) | Hardness Change | [Hs] | 10 | 8 | 5 | 5 | 10 | 6 | 9 | 2 |
| 175° C. for 240 hrs | Appearance |  | o | o | o | o | o | o | o | o |
| TEST-3 | Tensile Strength Change | [%] | 21 | 29 | 47 | 16 | 46 | 30 | −60 | 2 |
| (Heat-aging | Elongation Change | [%] | −80 | −72 | −56 | −68 | −80 | −88 | −95 | −10 |
| Resistance-2) | Hardness Change | [Hs] | 20 | 20 | 17 | 18 | 20 | 17 | −21 | 3 |
| 200° C. for 240 hrs | Appearance |  | o | o | o | o | o | o | x | 0 |
| TEST-4 | Tensile Strength Change | [%] | −39 | −20 | −2 | −15 | −22 | −26 | −35 | −31 |
| (Engine Oil | Elongation Change | [%] | −45 | −35 | −25 | −32 | −36 | −40 | −45 | −30 |
| Resistance-1) | Hardness Change | [Hs] | −12 | −12 | −10 | −12 | −12 | −12 | −18 | −10 |
| 150° C. for 480 hrs | Change in Volume | [%] | 15.8 | 11.1 | 4.8 | 10.5 | 11.7 | 12 | 25 | 5.2 |
|  | Appearance |  | o | o | o | o | o | o | o | Δ |
| TEST-5 | Tensile Strength Change | [%] | −44 | −28 | −19 | −27 | −30 | −33 | −40 | −29 |
| (Engine Oil | Elongation Change | [%] | −52 | −44 | −38 | −38 | −44 | −46 | −50 | −25 |
| Resistance-2) | Hardness Change | [Hs] | −18 | −15 | −13 | −15 | −15 | −16 | −20 | −12 |
| 150° C. for 480 hrs | Appearance |  | o | o | o | o | o | o | o | Δ |
| TEST-6 |  | [%] | 35 | 32 | 33 | 28 | 38 | 40 | 50 | 30 |
| (Permanent |  |  |  |  |  |  |  |  |  |  |
| Compressive |  |  |  |  |  |  |  |  |  |  |
| Strain) |  |  |  |  |  |  |  |  |  |  |

The results in Table 2 show that the blended rubber of FKM and ACM provided in each example has heat-aging resistance sufficient to withstand rigorous conditions of 200° C. for 240 hours. It is apparent from the results that the blended rubber is excellent not only in heat-aging resistance evaluated in Tests 2 and 3 but also in engine oil resistance in Test 4 and resistance to oxygenated engine oil in Test 5. However, the comparison with the comparative example 1 shows that the value (A×B) obtained by multiplying the value A of nitrogen adsorption specific surface area (m²/g) by the value B (PHR) of part by weight of amounts of carbon black to be added is preferably not more than 3500. If this value exceeds 3500 as in the case of the example 6, the decrease in the elongation of the test piece under the test condition of 200° C. for 240 hours is made larger compared with those in other examples.

The results of the test using Vamac D in the comparative example 1 show that the decreases in both tensile strength and elongation under the test condition of 200° C. for 240 hours are large and thus ACM is unable to be used under such conditions.

Furthermore, results of the test using DAI-L G801 in the comparative example 2 show that FKM is excellent in heat-aging resistance, while it is inferior in engine oil resistance and oxygenated-engine oil resistance, probably due to the influence by additives added to engine oil. When the test piece after being tested was bent, cracks occurred, showing that this type of material is unable to be used.

(IV) Production of heat-resistant hose

Heat-resistant hoses 1–6 and comparative hoses 1–4 were produced as shown in Tables 3 and 4 by the following method using rubber materials provided in the examples and comparative examples described above for the materials of the inner tubular body (inner tube of the hose) and the outer tubular body (outer tube of the hose) with fiber reinforcements made from spun threads or filament threads composed of specified materials bonded therebetween.

First, the inner tube of the hose was extruded and then fiber reinforcements were knitted thereon and, after that, the outer tube was extruded and cut to a specified length. After a metal mandrel was inserted into this tube, primary vulcanization was carried out using water vapor under the condition of 160° C. for 60 minutes and, after the separation of the mold (pulling-out of the tube from the metal mandrel), the secondary vulcanization was carried out in an oven using heated air under the condition of 150° C. for 8 hours.

Assuming that these heat-resistant hoses provided in the hose examples are used ordinarily as hoses for a supercharger, the internal and external diameters of each hose in the examples were set to be 53 mm and 63 mm respectively, however, the evaluation results obtained here can be applied to a variety of air hoses or oil hoses other than the supercharger hoses as well.

(V) Method of testing and evaluating of heat-resistant hose and its result

Burst pressure (MPa), extracting force of reinforcing threads (N/mm), air-tightness/leakage pressure (MPa), heat-aging resistance and engine oil resistance of the heat-resistant hoses prepared in the above examples and comparative examples were evaluated by the following test methods.

Burst pressure (MPa) Evaluation was performed in accordance with JIS K6330, 4.2.1(2).

Extracting force of reinforcing threads: Part of the outer tube of a specified area was ripped off along the preliminarily formed cutting line in each of the heat-resistant hoses of the hose examples and hose comparative examples and one of the threads of the thus exposed fiber reinforcements was caught with a hook. The force required to pull out the thread with the hook was measured.

Air-tightness/leakage pressure (MPa): Evaluation was performed in accordance with JIS K6330 4.2.1(3)(a) by the following methods. A rigid pipe having an internal diameter of 48 mm and an outer diameter of 54 mm and provided with a ring-like rib with a width of 4 mm and a height of 1 mm and with a triangle shape in the cross section at its end portion thus increasing the outer diameter at its end portion to 56 mm was provided. Each of the hoses prepared in the hose examples and hose comparative examples was pressed against the rigid pipe along its length so that the latter was inserted into the test hose to the extent that the hose reached up to 30 mm from the end of the rigid pipe. The heat-resistant hose was clamped by a ring-like clamp ("HS32" manufactured by Sawakyu Kogyo Co.) at an approximately middle position of the inserted length with fastening force of 10% compression against the initial thickness of the hose. Then, gas leakage pressure of the heat-resistant hose at the portion into which the rigid pipe was kept inserted was measured by applying gas pressure in water.

Heat-aging resistance: A test piece of the heat-resistant hose with a length of about 25 mm was aged under the condition of 200° C. for 240 hours and left at room temperature for a period of time not less than 3 hours and not more than 24 hours, the test piece was put between two flat plates and was compressed rapidly until the inner diameter of the test piece becomes 50% of its original one in the vertical direction against the flat plate and, at this point, existence or absence of abnormality such as cracking and/or fracture in the test piece was evaluated.

Engine oil resistance: A test piece of the heat-resistant hose with a length of about 25 mm and with its one end sealed with a cork stopper was filled with engine oil (Toyota Castle Diesel Oil "New Special CD 10W-30") and immediately after that the engine oil was flown away. While this process was repeated every 24 hours, the test piece with the engine oil removed therefrom was aged under the condition of 200° C. for 240 hours and then existence or absence of abnormality was evaluated in the same manner as in the test for heat-aging resistance.

Table 3 shows the results for the hose examples 1–5 and Table 4 shows those for the hose comparative examples 1–4 respectively.

TABLE 3

| | Hose Examples (present invention) | | | | | |
|---|---|---|---|---|---|---|
| | 1 Ex. 1 | 2 Ex. 2 | 3 Ex. 3 | 4 Ex. 4 | 5 Ex. 5 | 6 Ex. 2 |
| Inner Tube Material Fiber Reinforcement | | | | | | |
| Material | FR-1 | FR-1 | FR-1 | FR-1 | FR-1 | FR-2 |
| denier/pc | 2000 | 2000 | 2000 | 2000 | 2000 | 1500 |
| Structure | Spun | Spun | Spun | Spun | Spun | Filament |
| Count (pc) | 48 | 48 | 48 | 48 | 48 | 16 |
| Twist number (T/m) | 200 | 200 | 200 | 200 | 200 | 100 |
| Outer Tube Material | | | | | | |
| Burst Pressure (MPa) | 0.72 | 0.70 | 0.74 | 0.71 | 0.72 | 0.70 |
| Extractinf Force (N/mm) | 4.9 | 4.3 | 3.3 | 3.9 | 4.4 | 2.2 |
| Leakage Pressure (MPa) | 0.28 | 0.25 | 0.21 | 0.24 | 0.26 | 0.16 |
| Heat-aging Resistance | Good | Good | Good | Good | Good | Good |
| Engine Oil Resistance | Good | Good | Good | Good | Good | Good |

FR-1: Aromatic polyamide fiber "CONEX" (brand name) from Teijin Limited
FR-2: Aromatic polyamide fiber "KEVLAR" (brand name) from DuPont Corp.

TABLE 4

| | Comparative Hose Examples | | | |
|---|---|---|---|---|
| | 1 Ex. 2 | 2 Comp.Ex. 1 | 3 Comp.Ex. 1 | 6 Comp.Ex. 2 |
| Inner Tube Material Fiber Reinforcement | | | | |
| Material | FR-2 | FR-3 | FR-1 | FR-2 |
| denier/pc | 1500 | 1500 | 2000 | 1500 |
| Structure | Filament | Filament | Spun | Spun |
| Count (pc) | 16 | 48 | 48 | 48 |
| Twist number (T/m) | 350 | 150 | 200 | 200 |
| Outer Tube Material | | | | |
| Burst Pressure (MPa) | 0.51 | 0.80 | 0.72 | 0.73 |
| Extractinf Force (N/mm) | 0.4 | 2.6 | 5.6 | 1.8 |
| Leakage Pressure (MPa) | 0.08 | 0.17 | 0.32 | 0.15 |
| Heat-aging Resistance | Good | Cracks observed on inner and outer rubber surfaces; threads partially broken. | Cracks observed on inner and outer rubber surfaces. | Good |
| Engine Oil Resistance | Good | Cracks observed on outer rubber surfaces. | Cracks observed on outer rubber surfaces. | Cracks observed on inner rubber surfaces. |

FR-1: Aromatic polyamide fiber "CONEX" (brand name) from Teijin Limited
FR-2: Aromatic polyamide fiber "KEVLAR" (brand name) from DuPont Corp.
FR-3: Polyester filament threads The results in Table 3 and 4 show the followings:
1) The extracting force of reinforcing threads was over 1.8N/mm in each of the hose examples 1–5 and hose comparative examples 3 and 4 in which spun threads are used as materials for fiber reinforcements. Among them, the extracting force of threads in the hose comparative example 4 in which FKM ("DAI-L G801") was used as materials for the inner and outer tubes of the heat-resistant hose exhibited the relatively lowest value.

2) Out of three hose examples in which filament threads were used as materials for fiber reinforcements, the hose comparative example 1 exhibited a remarkably low extracting force of reinforced threads was as low as 0.4N/mm. However, the extracting force of reinforced threads was passably satisfactory in the hose example 6 in which the filament threads having a twist number of 100 turn/m was used and in the hose example 2 in which Vamac D (ACM) was used as a material for the inner and outer tubes of the heat-resistant hose and the number of twist of the filament threads used was comparatively as small as 150 turn/m.

3) The results obtained in the air-tightness/leakage pressure test were approximately parallel with those in the extracting force of reinforced threads. Therefore, the air-tightness/leakage pressure as well as the extracting force of reinforced threads was excellent in the case that spun threads are used as materials for fiber reinforcements. They are also passably satisfactory in the case that filament threads if its number of twist was not more than 100 turn/m and/or ACM was used as materials for the inner and outer tubes of the heat-resistant hose.

The results also reveal that the heat-aging resistance of the hose comparative example 2 was markedly unsatisfactory and that of the hose comparative example 3 somewhat problematic. Furthermore, the evaluation has shown that engine oil resistance was bad in the hose comparative examples 2–4.

What is claimed is:

1. A heat-resistant hose for transport of high temperature fluid, wherein the inner surface of the hose in contact with said fluid comprises a material containing blended rubber of fluorinated rubber and acrylic rubber.

2. The heat-resistant hose as defined in claim 1 wherein the hose is to be used for fluid containing high temperature oil.

3. The heat-resistant hose as defined in claim 1 wherein the hose comprises an inner tubular body composed of one or more layers at least the most inner layer of which consists of blended rubber of fluorinated rubber and acrylic rubber, fiber reinforcements wound around the outer surface of said inner tubular body, and an outer tubular body composed of one or more layers bonded on the surface of said fiber reinforcements.

4. The heat-resistant hose as defined in claim 3 wherein the fiber reinforcements are composed of spun threads or filament threads with a twist number of not more than 100 turn/m.

5. The heat-resistant hose as defined in claim 4 wherein the thread extracting force of the fiber reinforcements is not less than 1N/mm.

6. The heat-resistant hose as defined in claim 1 wherein the blended rubber is rubber in which fluorinated rubber and acrylic rubber are uniformly dissolved together.

7. The heat-resistant hose as defined in claim 1 wherein the blending ratio of said blended rubber, in weight, of fluorinated rubber and acrylic rubber is within the range of 2~8:8~2.

8. The heat-resistant hose as defined in claim 1 wherein carbon black having the value (A×B) of not more than 3500 obtained by multiplying the value A of nitrogen adsorption specific surface area ($m^2/g$) by the value B (PHR) of part by weight of amounts of carbon black is added to the blended rubber.

9. The heat-resistant hose as defined in claim 2 wherein the fluid containing high temperature oil is a high temperature oil or a high temperature gas containing oil particles.

10. The heat-resistant hose as defined in claim 1 wherein the hose is a hose used for a supercharger.

* * * * *